US011029488B2

(12) United States Patent
Ori

(10) Patent No.: US 11,029,488 B2
(45) Date of Patent: *Jun. 8, 2021

(54) REAR CONVERTER LENS AND IMAGING APPARATUS

(71) Applicant: FUJIFILM Corporation, Tokyo (JP)

(72) Inventor: Tetsuya Ori, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/020,521

(22) Filed: Sep. 14, 2020

(65) Prior Publication Data

US 2021/0003819 A1    Jan. 7, 2021

Related U.S. Application Data

(62) Division of application No. 16/112,420, filed on Aug. 24, 2018.

(30) Foreign Application Priority Data

Sep. 15, 2017  (JP) ................................. 2017-177302

(51) Int. Cl.
*G02B 9/30* (2006.01)
*G02B 13/02* (2006.01)

(52) U.S. Cl.
CPC ............. *G02B 9/30* (2013.01); *G02B 13/02* (2013.01)

(58) Field of Classification Search
CPC ........ G02B 9/14; G02B 9/24–28; G02B 9/30; G02B 13/02; G02B 15/12

(Continued)

(56) References Cited

U.S. PATENT DOCUMENTS 3,877,796 A    4/1975  Yabe et al.
4,340,279 A *  7/1982  Ikemori ................. G02B 15/10
                                                           359/675

(Continued)

FOREIGN PATENT DOCUMENTS

DE    02354835 A1    11/1974
DE    02354835 B2    3/1977

(Continued)

OTHER PUBLICATIONS

An Office Action; "Notification of Reasons for Refusal," mailed by the Japanese Patent Office dated May 12, 2020, which corresponds to Japanese Patent Application No. 2017-177302 and is related to U.S. Appl. No. 16/112,420; with English language translation.

*Primary Examiner* — Nicholas R. Pasko
(74) *Attorney, Agent, or Firm* — Studebaker & Brackett PC

(57) ABSTRACT

The rear converter lens consists of, in order from an object side: a first lens group that has a positive refractive power; a second lens group that has a negative refractive power; and a third lens group that has a positive refractive power. The first lens group consists of a cemented lens in which a negative lens concave toward the image side and a positive lens convex toward the object side are cemented. The second lens group consists of a cemented lens in which a negative lens concave toward the image side, a positive lens convex toward both sides, and a negative lens concave toward the object side are cemented. The third lens group consists of a cemented lens in which a positive lens convex toward the object side and a negative lens are cemented. The rear converter lens satisfies predetermined Conditional Expressions (1) and (2).

15 Claims, 11 Drawing Sheets

(58) Field of Classification Search
USPC .......................................... 359/748, 784–790
See application file for complete search history.

(56) References Cited

U.S. PATENT DOCUMENTS

| | | |
|---|---|---|
| 4,653,877 A | 3/1987 | Hamanishi |
| 2015/0226943 A1* | 8/2015 | Ogata .................... G02B 15/12 348/374 |
| 2016/0223799 A1 | 8/2016 | Yoneyama |
| 2016/0274443 A1* | 9/2016 | Ogata .................... G03B 17/14 |
| 2017/0090163 A1 | 3/2017 | Ori |
| 2018/0095255 A1* | 4/2018 | Iwamoto .................. G02B 9/62 |
| 2019/0086645 A1* | 3/2019 | Ori ......................... G02B 13/02 |

FOREIGN PATENT DOCUMENTS

| | | |
|---|---|---|
| JP | H04-020163 B2 | 3/1992 |
| JP | H04-020165 B2 | 3/1992 |
| JP | 2002-267929 A | 9/2002 |
| JP | 2004-226648 A | 8/2004 |
| JP | 4337352 B2 | 9/2009 |
| JP | 4639581 B2 | 2/2011 |
| JP | 2016-177042 A | 10/2016 |
| JP | 2016-193122 A | 11/2016 |
| JP | 2017-062317 A | 3/2017 |

\* cited by examiner

EXAMPLE 1 (MASTER LENS ONLY)

EXAMPLE 1

EXAMPLE 2

EXAMPLE 4

REAR CONVERTER LENS AND IMAGING APPARATUS

CROSS-REFERENCE TO RELATED APPLICATIONS

The present application is a Divisional of U.S. patent application Ser. No. 16/112,420 filed Aug. 24, 2018, which claims priority under 35 U.S.C. § 119 to Japanese Patent Application No. 2017-177302 filed on Sep. 15, 2017. The above application is hereby expressly incorporated by reference, in its entirety, into the present application.

BACKGROUND OF THE INVENTION

1. Field of the Invention

The present invention relates to a rear converter lens, which is detachably mounted on the rear side (image side) of a master lens and in which a focal length of the whole system is increased, and an imaging apparatus comprising the rear converter lens.

2. Description of the Related Art

In the past, there are known rear converter lenses (rear conversion lenses) each of which is detachably mounted on a master lens (main lens) between a camera main body and the master lens and serves as an optical system in which a focal length of the whole lens system is increased. For example, JP1992-020165B (JP-H04-020165B), JP1992-020163B (JP-H04-020163B), JP4639581, JP4337352, and JP2017-062317A each disclose an optical system in which a master lens is equipped with a rear converter lens composed of three groups consisting of: a first lens group that has a positive refractive power; a second lens group that has a negative refractive power; and a third lens group that has a positive refractive power.

SUMMARY OF THE INVENTION

In recent years, attention has been focused on non-reflex digital cameras having no optical finders as an imaging apparatus. Recent improvements in the performance of imaging elements mounted on digital cameras are progressing. Thus, even for rear converter lenses mounted on non-reflex digital cameras, there is a demand to achieve high optical performance for the synthetic optical systems in which the rear converter lenses are mounted on the master lenses.

However, in order to combine recent high-performance imaging elements with the rear converter lenses described in JP1992-020165B (JP-H04-020165B), JP1992-020163B (JP-H04-020163B), JP4639581, JP4337352, and JP2017-062317A, there is a demand to obtain more favorable characteristics particularly in spherical aberration and field curvature.

The present invention has been made in consideration of the above-mentioned situation, and its object is to provide a rear converter lens, which has favorable optical performance, and an imaging apparatus comprising the rear converter lens.

A rear converter lens of the present invention has a negative refractive power and is mounted on an image side of a master lens so as to increase a focal length of the master lens. The rear converter lens consists of, in order from an object side: a first lens group that has a positive refractive power; a second lens group that has a negative refractive power; and a third lens group that has a positive refractive power. The first lens group consists of a cemented lens in which a negative lens concave toward the image side and a positive lens convex toward the object side are cemented in order from the object side. The second lens group consists of a cemented lens in which a negative lens concave toward the image side, a positive lens convex toward both sides, and a negative lens concave toward the object side are cemented in order from the object side. The third lens group consists of a cemented lens in which a positive lens convex toward the object side and a negative lens are cemented in order from the object side. Assuming that a focal length of the first lens group is f1, a focal length of the second lens group is f2, and a focal length of the rear converter lens is fC, Conditional Expressions (1) and (2) are satisfied.

$$-1.4 < f1/fC < -0.5 \tag{1}$$

$$0.2 < f2/fC < 0.36 \tag{2}$$

It is preferable to satisfy Conditional Expression (1-1) and/or (2-1).

$$-1.35 < f1/fC < -0.7 \tag{1-1}$$

$$0.25 < f2/fC < 0.35 \tag{2-1}$$

In the rear converter lens of the present invention, assuming that a focal length of the third lens group is f3 and the focal length of the rear converter lens is fC, it is preferable to satisfy the Conditional Expression (3), and it is more preferable to satisfy the Conditional Expression (3-1).

$$-1.5 < f3/fC < -0.8 \tag{3}$$

$$-1.3 < f3/fC < -0.9 \tag{3-1}$$

Assuming that an Abbe number of the negative lens of the first lens group is v1 and an Abbe number of the positive lens of the first lens group is v2, it is preferable to satisfy the Conditional Expression (4), and it is more preferable to satisfy the Conditional Expression (4-1).

$$12 < v1 - v2 < 45 \tag{4}$$

$$14 < v1 - v2 < 40 \tag{4-1}$$

An imaging apparatus of the present invention comprises the above-mentioned rear converter lens of the present invention.

It should be noted that the term "consists of ~" means that the rear converter lens may include not only the above-mentioned elements but also lenses substantially having no powers, optical elements, which are not lenses, such as a stop, a mask, a cover glass, and a filter, and mechanism parts such as a lens flange, a lens barrel, an imaging element, and a camera shaking correction mechanism.

Further, the Abbe number in each conditional expression is based on the d line as a reference wavelength.

Furthermore, surface shapes, signs of refractive powers, radii of curvature of the lenses are assumed as those in paraxial regions in a case where some lenses have aspheric surfaces.

The rear converter lens of the present invention has a negative refractive power and is mounted on an image side of a master lens so as to increase a focal length of the master lens. The rear converter lens consists of, in order from the object side: the first lens group that has a positive refractive power; the second lens group that has a negative refractive power; and the third lens group that has a positive refractive power. The first lens group consists of a cemented lens in which a negative lens concave toward the image side and a positive lens convex toward the object side are cemented in order from the object side. The second lens group consists of a cemented lens in which a negative lens concave toward the image side, a positive lens convex toward both sides, and a negative lens concave toward the object side are cemented in order from the object side. The third lens group consists of a cemented lens in which a positive lens convex toward the object side and a negative lens are cemented in order from the object side. Assuming that the focal length of the first lens group is f1, the focal length of the second lens group is f2, and a focal length of the rear converter lens is fC, Conditional Expressions (1) and (2) are satisfied. Therefore, it is possible to provide a rear converter lens, which has favorable optical performance, and an imaging apparatus comprising the rear converter lens.

$$-1.4 < f1/fC < -0.5 \qquad (1)$$

$$0.2 < f2/fC < 0.36 \qquad (2)$$

DESCRIPTION OF THE PREFERRED EMBODIMENTS

Figure 1:
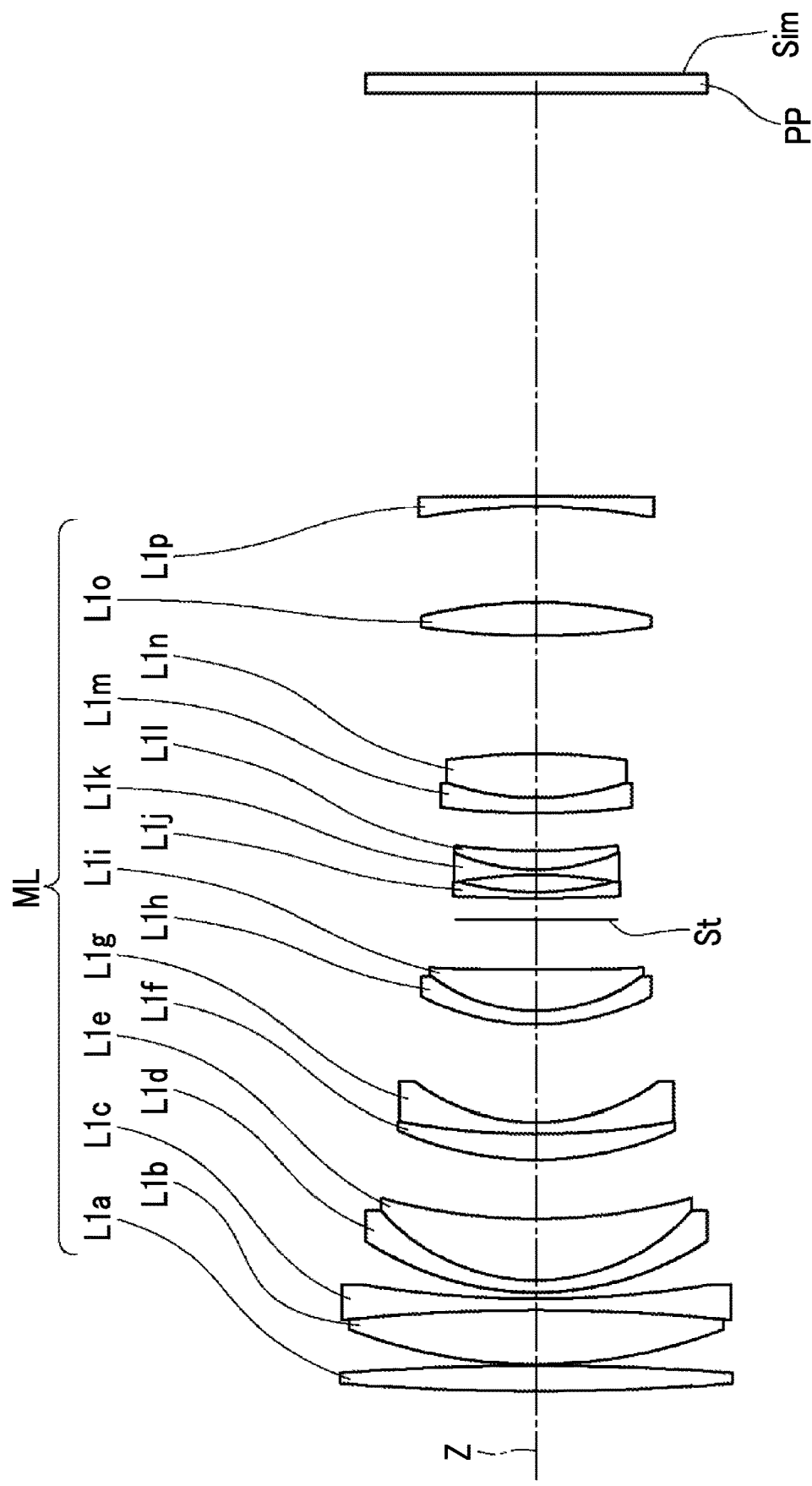
FIG. 1 is a cross-sectional view illustrating an example of a lens configuration of a master lens to be combined with a rear converter lens of the present invention.
Figure 2:
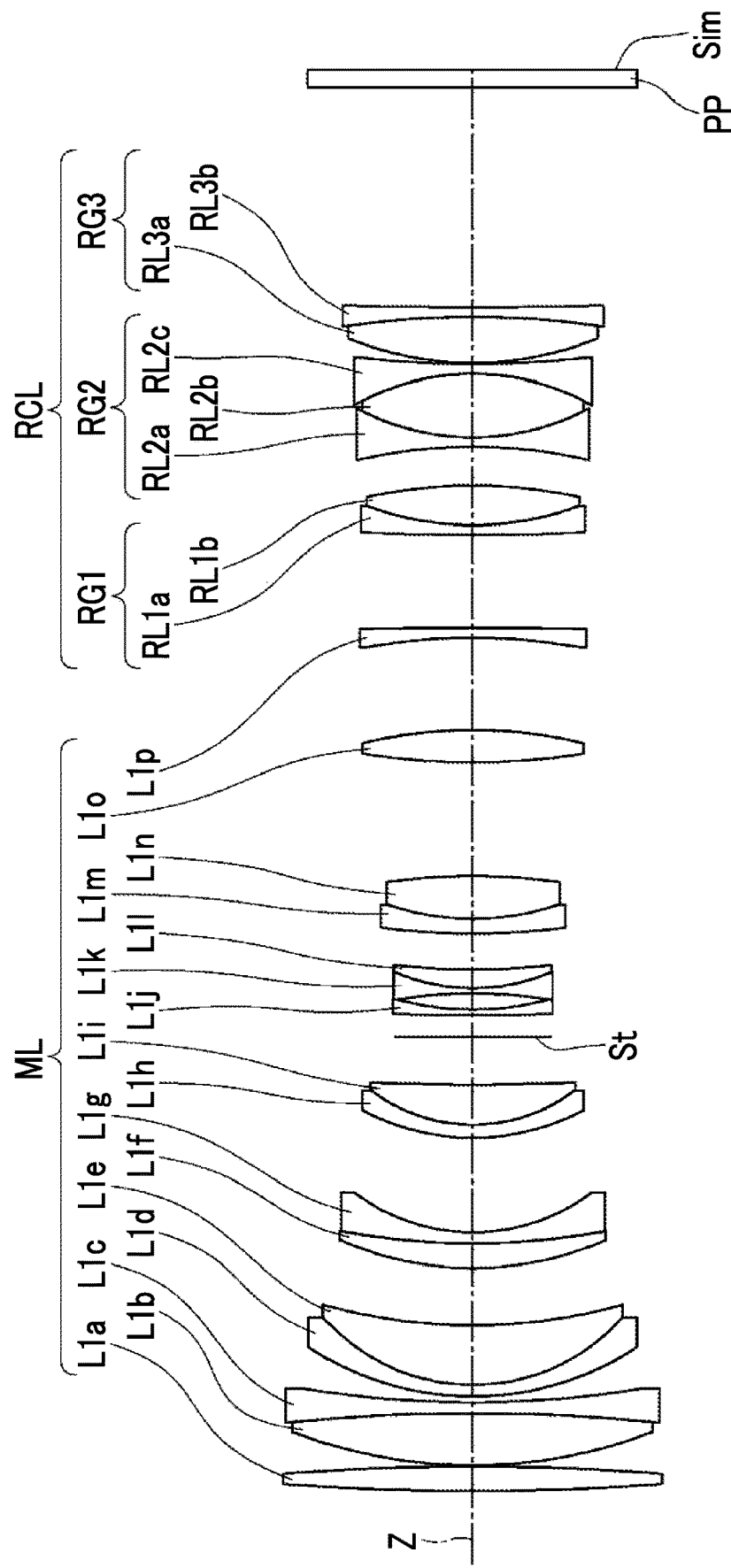
FIG. 2 is a cross-sectional view illustrating a lens configuration in a state where a rear converter lens according to an embodiment of the present invention (common to Example 1) is mounted on the master lens.

Hereinafter, an embodiment of the present invention will be described with reference to drawings. FIG. 1 is a cross-sectional view illustrating an example of a lens configuration of a master lens to be combined with a rear converter lens of the present invention. FIG. 2 is a cross-sectional view illustrating a lens configuration in a state where a rear converter lens according to an embodiment of the present invention (common to Example 1) is mounted on the master lens. The exemplary configuration shown in FIG. 2 is the same as the configuration of the rear converter lens of Example 1. In each of FIGS. 1 and 2, the left side is an object side, and the right side is an image side. In addition, an aperture stop St shown in the drawing does not necessarily show its real size and shape, but show a position on an optical axis Z.

A rear converter lens RCL has a negative refractive power and is mounted on an image side of a master lens ML so as to increase a focal length of the master lens ML. Hereinafter, a synthetic optical system (whole system), in which the rear converter lens RCL is mounted on the master lens ML, is simply referred to as a synthetic optical system.

The rear converter lens RCL of the present embodiment is composed of, in order from an object side: a first lens group RG1 that has a positive refractive power; a second lens group RG2 that has a negative refractive power; and a third lens group RG3 that has a positive refractive power. As described above, in the rear converter lens RCL, lens groups are arranged to have positive, negative, and positive refractive powers. Thereby, it is possible to suppress fluctuation in spherical aberration and curvature of field curvature caused by mounting the rear converter lens RCL. Further, by making the first lens group RG1 to have a positive refractive power, it is possible to make the position of the front principal point of the synthetic optical system closer to the image side. Thus, the back focal length of the synthetic optical system can be shortened, and in particular, it is possible to obtain a length suitable for a non-reflex digital camera.

The first lens group RG1 is composed of a cemented lens in which a negative lens RL1a concave toward the image side and a positive lens RL1b convex toward the object side are cemented in order from the object side. With such a configuration, it is possible to suppress fluctuation in longitudinal chromatic aberration caused by mounting of the rear converter lens RCL. Further, by cementing two lenses in the first lens group RG1, it is possible to suppress occurrence of a ghost between lens surfaces, and it is possible to reduce an effect of relative position error between lens groups, such as eccentricity.

The second lens group RG2 is composed of a cemented lens in which a negative lens RL2a concave toward the image side, a positive lens RL2b convex toward both sides, and a negative lens RL2c concave toward the object side are cemented in order from the object side. In a case where the negative refractive power is increased in the second lens group RG2, longitudinal chromatic aberration of the synthetic optical system tends to change greatly. However, by forming a three-piece cemented lens composed of the negative lens RL2a, the positive lens RL2b, and the negative lens RL2c, it is possible to minimize occurrence of longitudinal chromatic aberration caused by mounting the rear converter lens RCL. Further, by cementing three lenses in the second lens group RG2, it is possible to suppress occurrence of a ghost between lens surfaces, and it is possible to reduce an effect of relative position error between lens groups, such as eccentricity.

The third lens group RG3 is composed of a cemented lens in which a positive lens RL3a convex toward the object side and a negative lens RL3b are cemented in order from the object side. As described above, the object side surface of the third lens group RG3 is formed as a convex surface. Thereby, it is possible to suppress fluctuation in spherical aberration caused by mounting the rear converter lens RCL. Further, by cementing two lenses in the third lens group RG3, it is possible to suppress occurrence of a ghost between lens surfaces, and it is possible to reduce an effect of relative position error between lens groups, such as eccentricity.

Assuming that a focal length of the first lens group RG1 is f1, a focal length of the second lens group RG2 is f2, and a focal length of the rear converter lens RCL is fC, the lens is configured to satisfy Conditional Expressions (1) and (2).

$$-1.4 < f1/fC < -0.5 \quad (1)$$

$$0.2 < f2/fC < 0.36 \quad (2)$$

Conditional Expression (1) is a condition suitable for a high-performance rear converter lens RCL, particularly for a non-reflex digital camera. By not allowing the result of Conditional Expression (1) to be equal to or less than the lower limit, it is possible to prevent the front principal point of the rear converter lens RCL from becoming excessively close to the object side, and the object point position of the rear converter lens RCL becomes excessively close to the object side. Thus, it is possible to ensure the back focal length of the synthetic optical system and to facilitate attachment to the digital camera. Further, there is also an advantage in correcting field curvature. By not allowing the result of Conditional Expression (1) to be equal to or greater than the upper limit, it is possible to prevent the front principal point of the rear converter lens RCL from becoming excessively close to the image side, and the object point position of the rear converter lens RCL becomes excessively close to the image side. Thus, it is possible to prevent the back focal length of the synthetic optical system from becoming longer and to shorten the total lens length. Further, there is also an advantage in correcting spherical aberration. In this case, in a case where the distance between the master lens ML and the rear converter lens RCL is increased, the composite back focal length is shortened, but the enlarging magnification of the focal length is decreased by mounting the rear converter lens RCL. In addition, in a case where Conditional Expression (1-1) is satisfied, it is possible to obtain more favorable characteristics.

$$-1.35 < f1/fC < -0.7 \quad (1-1)$$

Conditional Expression (2) is also a condition suitable for a high-performance rear converter lens RCL, particularly for a non-reflex digital camera. By not allowing the result of Conditional Expression (2) to be equal to or less than the lower limit, it is possible to prevent the front principal point of the rear converter lens RCL from becoming excessively close to the image side, and the object point position of the rear converter lens RCL becomes excessively close to the image side. Thus, it is possible to prevent the back focal length of the synthetic optical system from becoming longer and to shorten the total lens length. Further, there is also an advantage in correcting field curvature. In this case, in a case where the distance between the master lens ML and the rear converter lens RCL is increased, the composite back focal length is shortened, but the enlarging magnification of the focal length is decreased by mounting the rear converter lens RCL. By not allowing the result of Conditional Expression (2) to be equal to or greater than the upper limit, it is possible to prevent the front principal point of the rear converter lens RCL from becoming excessively close to the object side, and the object point position of the rear converter lens RCL becomes excessively close to the object side. Thus, it is possible to ensure the back focal length of the synthetic optical system and to facilitate attachment to the digital camera. Further, there is also an advantage in correcting spherical aberration. In addition, in a case where Conditional Expression (2-1) is satisfied, it is possible to obtain more favorable characteristics.

$$0.25 < f2/fC < 0.35 \quad (2-1)$$

In the rear converter lens of the present embodiment, assuming that a focal length of the third lens group RG3 is f3 and the focal length of the rear converter lens RCL is fC, it is preferable to satisfy the Conditional Expression (3). Conditional Expression (3) is also a condition suitable for a high-performance rear converter lens RCL, particularly for a non-reflex digital camera. By not allowing the result of Conditional Expression (3) to be equal to or less than the lower limit, it is possible to prevent the front principal point of the rear converter lens RCL from becoming excessively close to the image side, and the object point position of the rear converter lens RCL becomes excessively close to the image side. Thus, it is possible to prevent the back focal length of the synthetic optical system from becoming longer and to shorten the total lens length. Further, there is also an advantage in correcting field curvature. In this case, in a case where the distance between the master lens ML and the rear converter lens RCL is increased, the composite back focal length is shortened, but the enlarging magnification of the focal length is decreased by mounting the rear converter lens RCL. By not allowing the result of Conditional Expression (3) to be equal to or greater than the upper limit, it is possible to prevent the front principal point of the rear converter lens RCL from becoming excessively close to the object side, and the object point position of the rear converter lens RCL becomes excessively close to the object side. Thus, it is possible to ensure the back focal length of the synthetic optical system and to facilitate attachment to the digital camera. Further, there is also an advantage in correcting distortion. In addition, in a case where Conditional Expression (3-1) is satisfied, it is possible to obtain more favorable characteristics.

$$-1.5 < f3/fC < -0.8 \quad (3)$$

$$-1.3 < f3/fC < -0.9 \quad (3-1)$$

Assuming that an Abbe number of the negative lens RL1$a$ of the first lens group RG1 is v1 and an Abbe number of the positive lens RL1$b$ of the first lens group RG1 is v2, it is preferable to satisfy the Conditional Expression (4). Conditional Expression (4) is a condition for suppressing fluctuation in chromatic aberration caused by mounting the rear converter lens RCL. By not allowing the result of Conditional Expression (4) to be equal to or less than the lower limit, there is an advantage in correcting longitudinal chromatic aberration. By not allowing the result of Conditional Expression (4) to be equal to or greater than the upper limit, there is an advantage in correcting lateral chromatic aberration. In addition, in a case where Conditional Expression (4-1) is satisfied, it is possible to obtain more favorable characteristics.

$$12 < v1 - v2 < 45 \quad (4)$$

$$14 < v1 - v2 < 40 \quad (4-1)$$

In a case where the rear converter lens RCL is used in a severe environment, it is preferable to apply protective multilayer film coating. Not only the protective coating but also antireflective coating for reducing ghost light in use may be performed.

In each of the examples shown in FIGS. 1 and 2, a plane-parallel-plate-like optical member PP, which is assumed as a low-pass filter and various filters for cutting specific wavelength regions, is disposed between the lens system and the image plane Sim. The present invention is not limited to this, and these various filters do not have to be disposed between the lens system and the image plane Sim. Instead, these various filters may be disposed between the respective lenses. Further, for example, coating having the same function as the various filters may be applied to a lens surface of any one of the lenses.

Next, a configuration example of the master lens ML and numerical examples of the rear converter lens RCL of the present invention will be described.

First, the master lens ML will be described. FIG. 1 shows a cross-sectional view of the master lens ML. Further, Table 1 shows specific lens data corresponding to a configuration using the master lens ML alone, and Table 2 shows data about specification and variable surface distances.

In the lens data of Table 1, the column of the surface number shows surface numbers. The surface of the elements closest to the magnification side is the first surface, and the surface numbers sequentially increase toward the reduction side. The column of the radius of curvature shows radii of curvature of the respective surfaces. The column of the on-axis surface distance shows spacings on the optical axis Z between the respective surfaces and the subsequent surfaces. Further, the column of n shows a refractive index of each optical element at the d line (a wavelength of 587.6 nm (nanometers)), and the column of vd shows an Abbe number of each optical element at the d line (a wavelength of 587.6 nm (nanometers)). It should be noted that the sign of the radius of curvature is positive in a case where a surface has a shape convex toward the object side, and is negative in a case where a surface has a shape convex toward the image side. Table 1 additionally shows the stop St and the optical member PP, and in a place of a surface number of a surface corresponding to the stop St, the surface number and a term of (stop) are noted.

Table 2 shows values of the focal length f of the whole system, the back focal length Bf of the whole system, the F number FNo., and the maximum angle of view 2ω. It should be noted that the back focal length Bf is an air-converted value. In the lens data and the expression data, a degree (°) is used as a unit of an angle, and mm is used as a unit of a length, but appropriate different units may be used since the optical system can be used even in a case where the system is enlarged or reduced in proportion.

Table 1

Example 1 (Master Lens Only)•Lens Data (n and v are Based on d Line)

TABLE 2

| Surface Number | Radius of Curvature | Surface Distance | n | v |
|---|---|---|---|---|
| 1 | 437.9481 | 4.3400 | 1.48749 | 70.24 |
| 2 | −437.9481 | 0.2300 | | |
| 3 | 88.2356 | 9.2300 | 1.49700 | 81.54 |
| 4 | −318.6800 | 1.9500 | 1.65160 | 58.62 |
| 5 | 184.2906 | 1.0500 | | |
| 6 | 52.2197 | 2.0600 | 1.51742 | 52.43 |

TABLE 2-continued

| Surface Number | Radius of Curvature | Surface Distance | n | v |
|---|---|---|---|---|
| 7 | 35.0700 | 10.6000 | 1.49700 | 81.54 |
| 8 | 99.3624 | 10.1100 | | |
| 9 | 58.2609 | 4.3800 | 1.90366 | 31.31 |
| 10 | 128.2200 | 1.9500 | 1.80610 | 40.93 |
| 11 | 34.8158 | 16.6200 | | |
| 12 | 41.4281 | 2.3200 | 1.56732 | 42.82 |
| 13 | 29.5030 | 7.1100 | 1.43875 | 94.66 |
| 14 | 439.0296 | 8.5200 | | |
| 15(Stop) | ∞ | 3.7100 | | |
| 16 | 356.6297 | 1.0300 | 1.85150 | 40.78 |
| 17 | 50.9986 | 2.8900 | | |
| 18 | −79.3300 | 0.9000 | 1.72916 | 54.09 |
| 19 | 34.9710 | 3.2800 | 1.84666 | 23.78 |
| 20 | 109.9049 | 6.4100 | | |
| 21 | 130.5900 | 2.6300 | 1.89286 | 20.36 |
| 22 | 45.9840 | 7.6100 | 1.67003 | 47.20 |
| 23 | −108.5346 | 20.1500 | | |
| 24 | 129.0771 | 5.6900 | 1.60342 | 38.03 |
| 25 | −82.4767 | 16.4200 | | |
| 26 | −104.7176 | 1.7500 | 1.72916 | 54.68 |
| 27 | −1000.2365 | 68.8437 | | |
| 28 | ∞ | 3.2000 | 1.51680 | 64.20 |
| 29 | ∞ | 0.0000 | | |

Example 1 (Master Lens Only) Specification (d Line)

| f | 242.54 |
|---|---|
| Bf | 70.95 |
| FNo. | 4.12 |
| 2ω[°] | 13.4 |

Regarding meanings of signs in the above Tables, Tables 1 and 2 are used as examples. However, Tables 3 to 10 are basically the same. Tables 3 to 10 shows respective data pieces of all configurations in which the master lenses ML shown in Tables 1 and 2 and the rear converter lenses RCL corresponding to Examples 1 to 4 each are combined. The master lens ML is exemplified to be the same in Examples 1 to 4, and the lens data pieces about the rear converter lenses RCL of Examples 1 to 4 correspond to surface numbers 28 to 37 in Tables 3, 5, 7 and 9. Further, the focal length f of the whole system indicates the focal length of the master lens ML alone in Table 2, and indicates the composite focal length of the synthetic optical system, in which the rear converter lens RCL and the master lens ML are combined, in Tables 4, 6, 8, and 10. The back focal length Bf of the whole system indicates the back focal length of the master lens alone in Table 2, and indicates the back focal length of the synthetic optical system, in which the rear converter lens RCL and the master lens ML are combined, in Tables 4, 6, 8 and 10.

Figure 6:
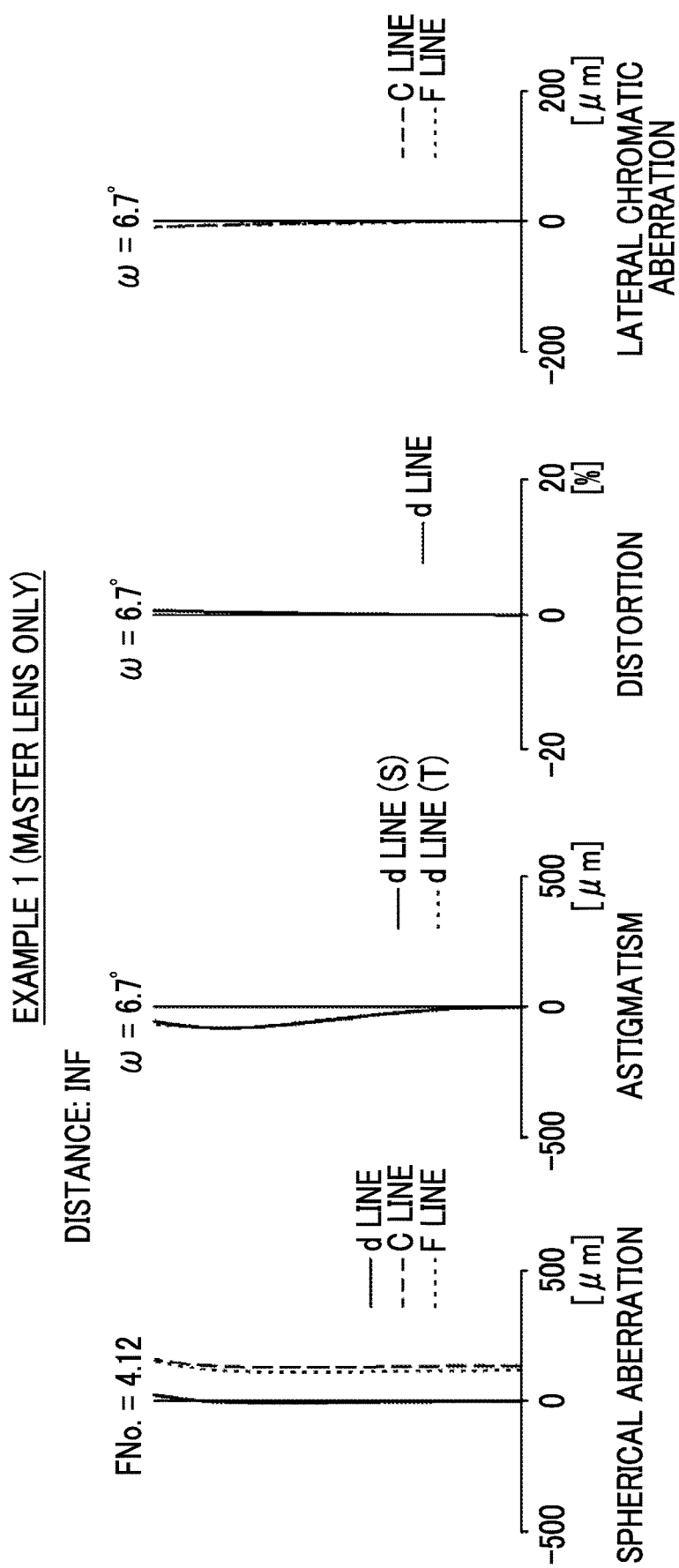
FIG. 6 is a diagram of aberrations of the master lens combined with the rear converter lens according to each embodiment of the present invention.

FIG. 6 shows diagrams of aberrations of the master lens ML alone. In addition, in order from the left side of FIG. 6, spherical aberration, astigmatism, distortion, and lateral chromatic aberration are shown. The aberration diagrams illustrating spherical aberration, astigmatism, and distortion indicate aberrations that occur in a case where the d line (a wavelength of 587.6 nm (nanometers)) is set as a reference wavelength. In the spherical aberration diagram, aberrations at the d line (a wavelength of 587.6 nm (nanometers)), the C line (a wavelength of 656.3 nm (nanometers)), and the F line (a wavelength of 486.1 nm (nanometers)) are respectively indicated by the solid line, the long dashed line, and the short dashed line. In the astigmatism diagram, aberrations in sagittal and tangential directions are respectively indicated by the solid line and the short dashed line. In the lateral chromatic aberration, aberrations at the C line (a wavelength of 656.3 nm (nanometers)) and F line (a wavelength of 486.1 nm (nanometers)) are respectively indicated by the long dashed line and the short dashed line. In addition, in the spherical aberration diagram, FNo. means an F number. In the other aberration diagrams, w means a half angle of view. The meanings of the reference signs are, for example, as described in FIG. 6, and are basically the same as those in FIGS. 7 to 10. Further, all the aberration diagrams shown in FIGS. 6 to 10 are based on a case where the object distance is at the infinity.

Figure 7:
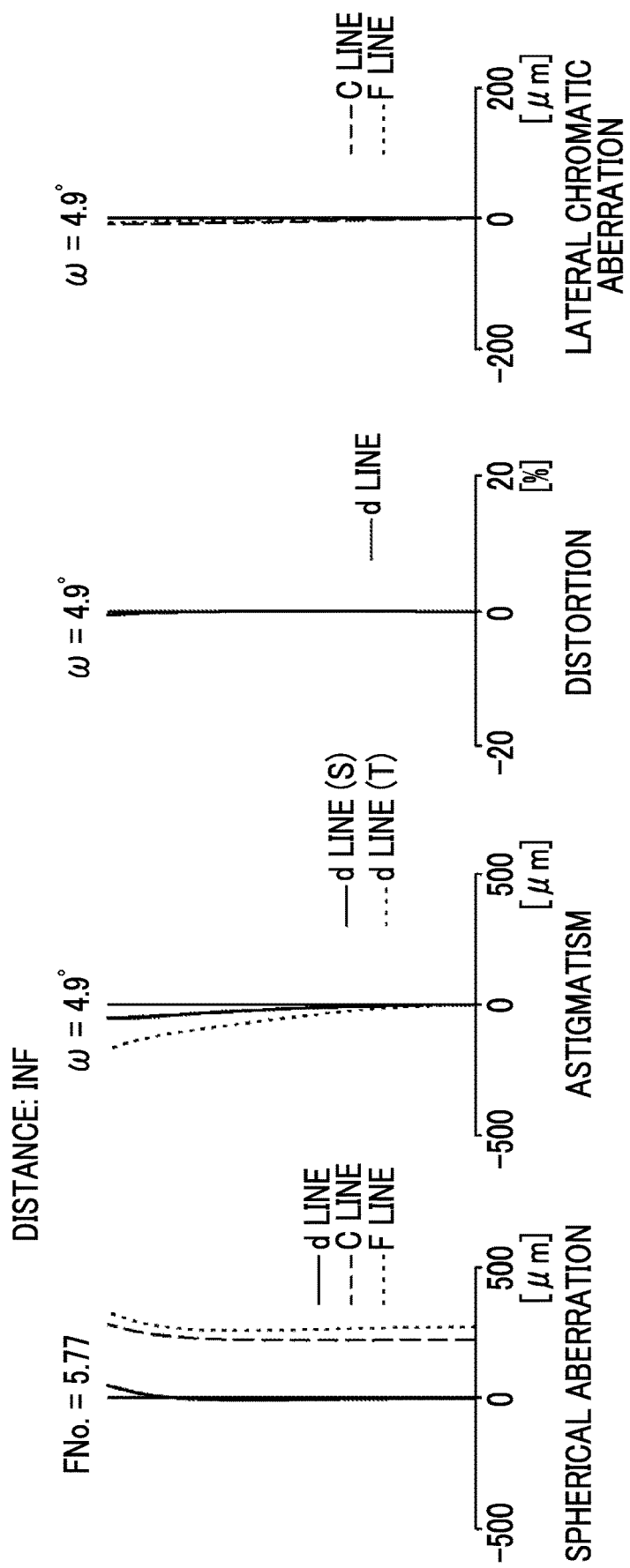
FIG. 7 is a diagram of aberrations in the state where the rear converter lens of Example 1 of the present invention is mounted on the master lens.

Next, the rear converter lens RCL of Example 1 will be described. FIG. 2 shows a cross-sectional view illustrating the entire configuration in a state where the rear converter lens RCL of Example 1 is mounted on the master lens ML. Table 3 shows lens data of the synthetic optical system in which the rear converter lens RCL of Example 1 is mounted on the master lens ML. Table 4 shows data about specification. Further, FIG. 7 shows aberration diagrams in a state where the rear converter lens RCL of Example 1 is mounted on the master lens ML.

Table 3

Example 1•Lens Data (n and ν are Based on d Line)

TABLE 4

| Surface Number | Radius of Curvature | Surface Distance | n | ν |
|---|---|---|---|---|
| 1 | 437.9481 | 4.3400 | 1.48749 | 70.24 |
| 2 | −437.9481 | 0.2300 | | |
| 3 | 88.2356 | 9.2300 | 1.49700 | 81.54 |
| 4 | −318.6800 | 1.9500 | 1.65160 | 58.62 |
| 5 | 184.2906 | 1.0500 | | |
| 6 | 52.2197 | 2.0600 | 1.51742 | 52.43 |
| 7 | 35.0700 | 10.6000 | 1.49700 | 81.54 |
| 8 | 99.3624 | 10.1100 | | |
| 9 | 58.2609 | 4.3800 | 1.90366 | 31.31 |
| 10 | 128.2200 | 1.9500 | 1.80610 | 40.93 |
| 11 | 34.8158 | 16.6200 | | |
| 12 | 41.4281 | 2.3200 | 1.56732 | 42.82 |
| 13 | 29.5030 | 7.1100 | 1.43875 | 94.66 |
| 14 | 439.0296 | 8.5200 | | |
| 15(Stop) | ∞ | 3.7100 | | |
| 16 | 356.6297 | 1.0300 | 1.85150 | 40.78 |
| 17 | 50.9986 | 2.8900 | | |
| 18 | −79.3300 | 0.9000 | 1.72916 | 54.09 |
| 19 | 34.9710 | 3.2800 | 1.84666 | 23.78 |
| 20 | 109.9049 | 6.4100 | | |
| 21 | 130.5900 | 2.6300 | 1.89286 | 20.36 |
| 22 | 45.9840 | 7.6100 | 1.67003 | 47.20 |
| 23 | −108.5346 | 20.1500 | | |
| 24 | 129.0771 | 5.6900 | 1.60342 | 38.03 |
| 25 | −82.4767 | 16.4200 | | |
| 26 | −104.7176 | 1.7500 | 1.72916 | 54.68 |
| 27 | −1000.2365 | 16.4997 | | |
| 28 | 425.3981 | 1.7000 | 1.71299 | 53.87 |
| 29 | 53.7890 | 6.9700 | 1.59551 | 39.24 |
| 30 | −88.1371 | 6.8500 | | |
| 31 | −91.6290 | 1.7000 | 1.88300 | 39.22 |
| 32 | 43.0030 | 11.2000 | 1.62588 | 35.74 |
| 33 | −43.0030 | 1.7000 | 1.75500 | 52.32 |
| 34 | 173.8058 | 0.2000 | | |
| 35 | 57.9507 | 8.1500 | 1.65412 | 39.68 |
| 36 | −151.5200 | 1.7300 | 2.00272 | 19.32 |
| 37 | 898.0469 | 38.9201 | | |
| 38 | ∞ | 3.2000 | 1.51680 | 64.20 |
| 39 | ∞ | 0.0000 | | |

Example 1•Specification (d Line)

| f | 339.58 |
|---|---|
| Bf | 41.03 |
| FNo. | 5.77 |
| 2ω[°] | 9.8 |

Figure 3:
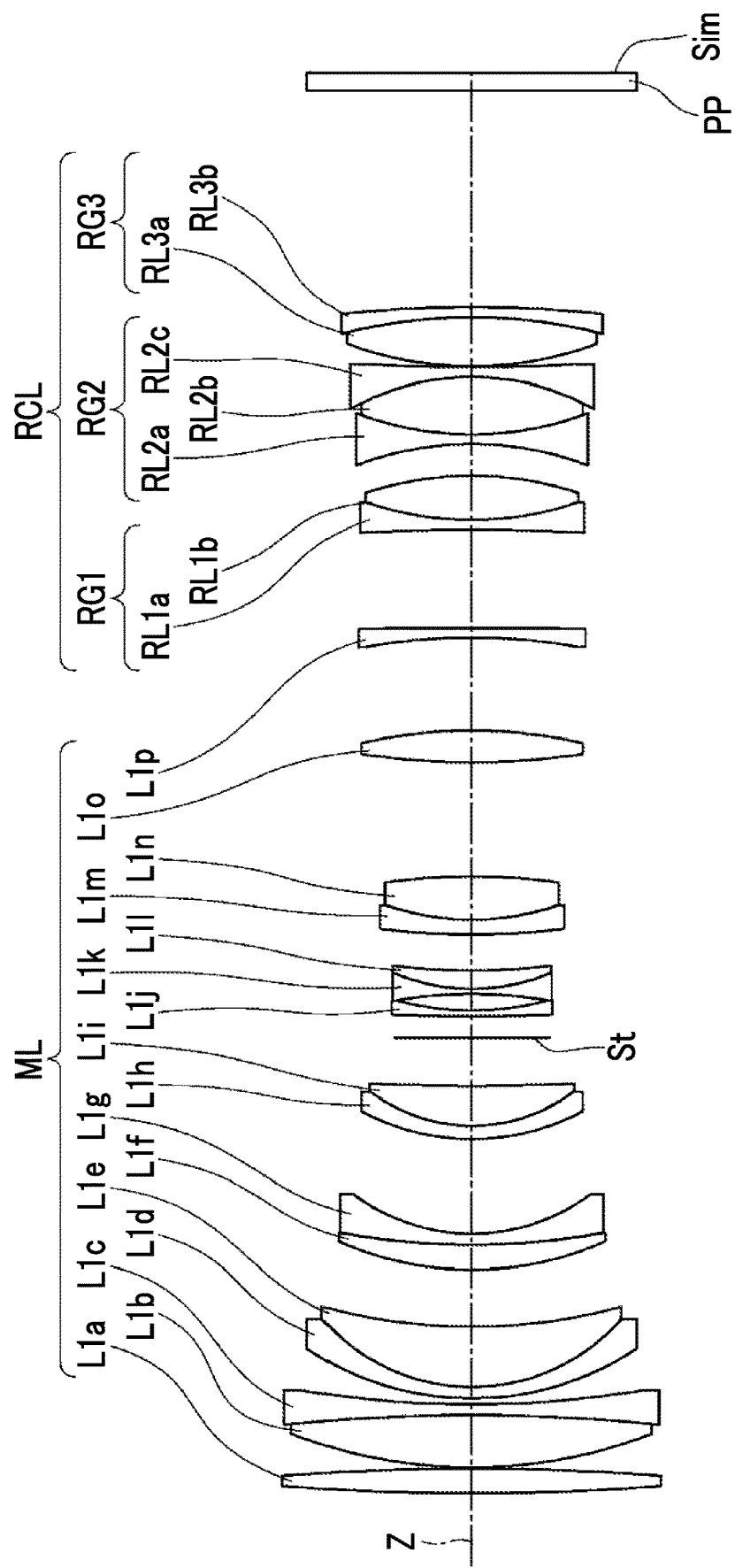
FIG. 3 is a cross-sectional view illustrating a lens configuration in a state where a rear converter lens according to Example 2 of the present invention is mounted on the master lens.
Figure 8:
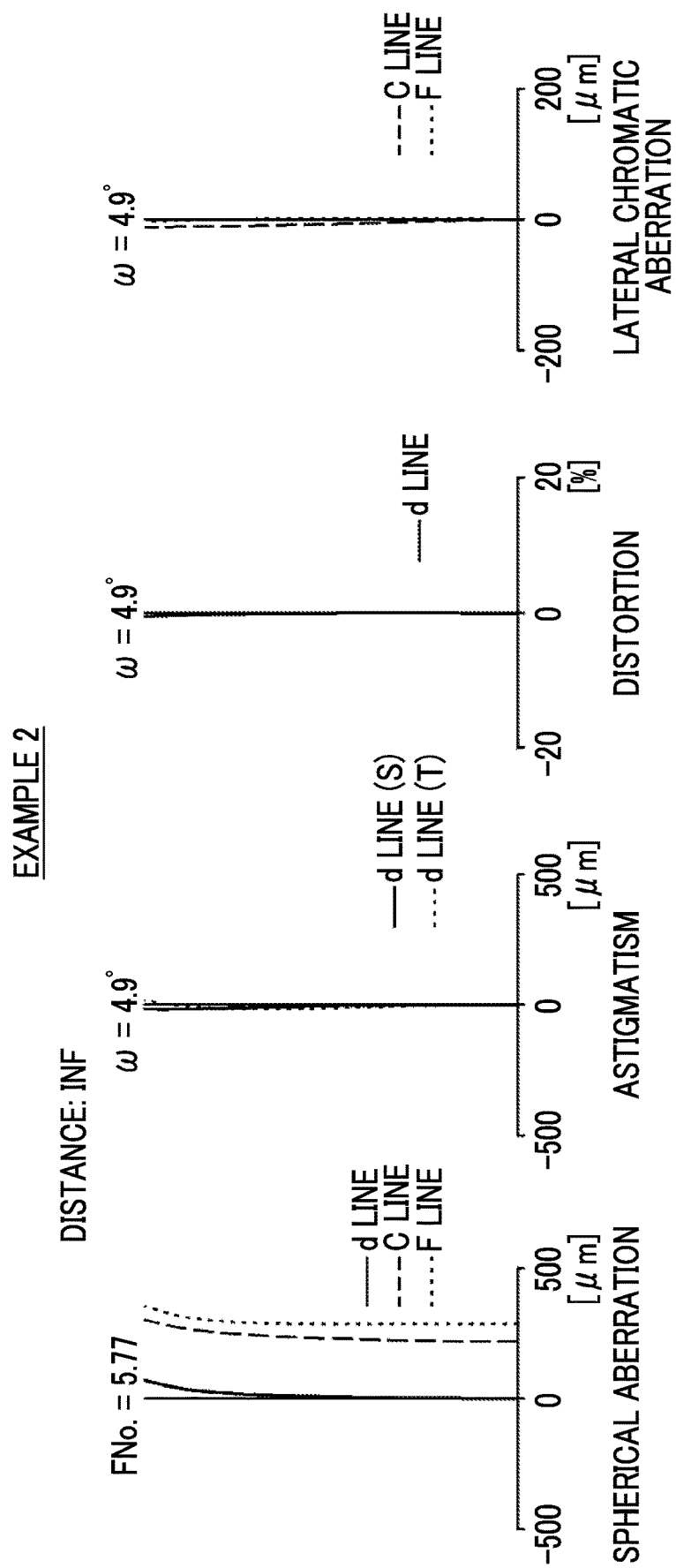
FIG. 8 is a diagram of aberrations in the state where the rear converter lens of Example 2 of the present invention is mounted on the master lens.

Next, the rear converter lens RCL of Example 2 will be described. FIG. 3 shows a cross-sectional view illustrating the entire configuration in a state where the rear converter lens RCL of Example 2 is mounted on the master lens ML. Table 5 shows lens data of the synthetic optical system in which the rear converter lens RCL of Example 2 is mounted on the master lens ML. Table 6 shows data about specification. Further, FIG. 8 shows aberration diagrams in a state where the rear converter lens RCL of Example 2 is mounted on the master lens ML.

Table 5

Example 2•Lens Data (n and ν are Based on d Line)

TABLE 6

| Surface Number | Radius of Curvature | Surface Distance | n | ν |
|---|---|---|---|---|
| 1 | 437.9481 | 4.3400 | 1.48749 | 70.24 |
| 2 | −437.9481 | 0.2300 | | |
| 3 | 88.2356 | 9.2300 | 1.49700 | 81.54 |
| 4 | −318.6800 | 1.9500 | 1.65160 | 58.62 |
| 5 | 184.2906 | 1.0500 | | |
| 6 | 52.2197 | 2.0600 | 1.51742 | 52.43 |
| 7 | 35.0700 | 10.6000 | 1.49700 | 81.54 |
| 8 | 99.3624 | 10.1100 | | |
| 9 | 58.2609 | 4.3800 | 1.90366 | 31.31 |
| 10 | 128.2200 | 1.9500 | 1.80610 | 40.93 |
| 11 | 34.8158 | 16.6200 | | |
| 12 | 41.4281 | 2.3200 | 1.56732 | 42.82 |
| 13 | 29.5030 | 7.1100 | 1.43875 | 94.66 |
| 14 | 439.0296 | 8.5200 | | |
| 15(Stop) | ∞ | 3.7100 | | |
| 16 | 356.6297 | 1.0300 | 1.85150 | 40.78 |
| 17 | 50.9986 | 2.8900 | | |
| 18 | −79.3300 | 0.9000 | 1.72916 | 54.09 |
| 19 | 34.9710 | 3.2800 | 1.84666 | 23.78 |
| 20 | 109.9049 | 6.4100 | | |
| 21 | 130.5900 | 2.6300 | 1.89286 | 20.36 |
| 22 | 45.9840 | 7.6100 | 1.67003 | 47.20 |
| 23 | −108.5346 | 20.1500 | | |
| 24 | 129.0771 | 5.6900 | 1.60342 | 38.03 |
| 25 | −82.4767 | 16.4200 | | |
| 26 | −104.7176 | 1.7500 | 1.72916 | 54.68 |
| 27 | −1000.2365 | 17.3554 | | |
| 28 | −370.3267 | 1.7000 | 1.48749 | 70.24 |
| 29 | 57.7238 | 7.8583 | 1.56732 | 42.82 |
| 30 | −57.7238 | 5.5688 | | |
| 31 | −57.3848 | 1.7000 | 1.88300 | 39.22 |
| 32 | 57.3848 | 10.0990 | 1.64769 | 33.84 |
| 33 | −43.9167 | 1.7000 | 1.83481 | 42.74 |
| 34 | 313.7482 | 0.2000 | | |
| 35 | 64.4023 | 8.5923 | 1.51742 | 52.43 |
| 36 | −92.5109 | 1.7726 | 2.00100 | 29.13 |
| 37 | −226.3306 | 38.3473 | | |
| 38 | ∞ | 3.2000 | 1.51680 | 64.20 |
| 39 | ∞ | 0.0000 | | |

Example 2•Specification (d Line)

| | |
|---|---|
| f | 339.54 |
| Bf | 40.46 |
| FNo. | 5.77 |
| 2ω[°] | 9.8 |

Figure 4:
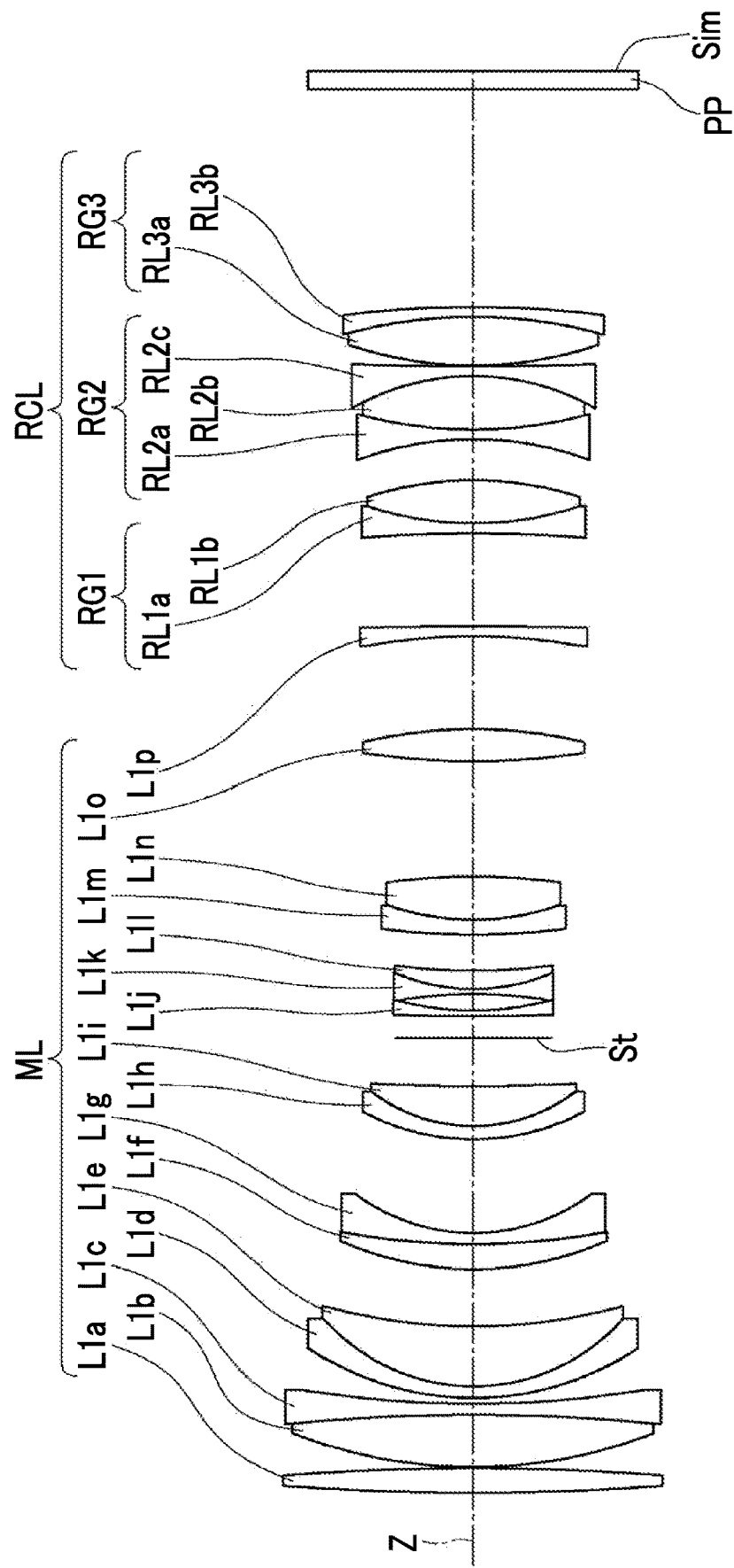
FIG. 4 is a cross-sectional view illustrating a lens configuration in a state where a rear converter lens according to Example 3 of the present invention is mounted on the master lens.
Figure 9:
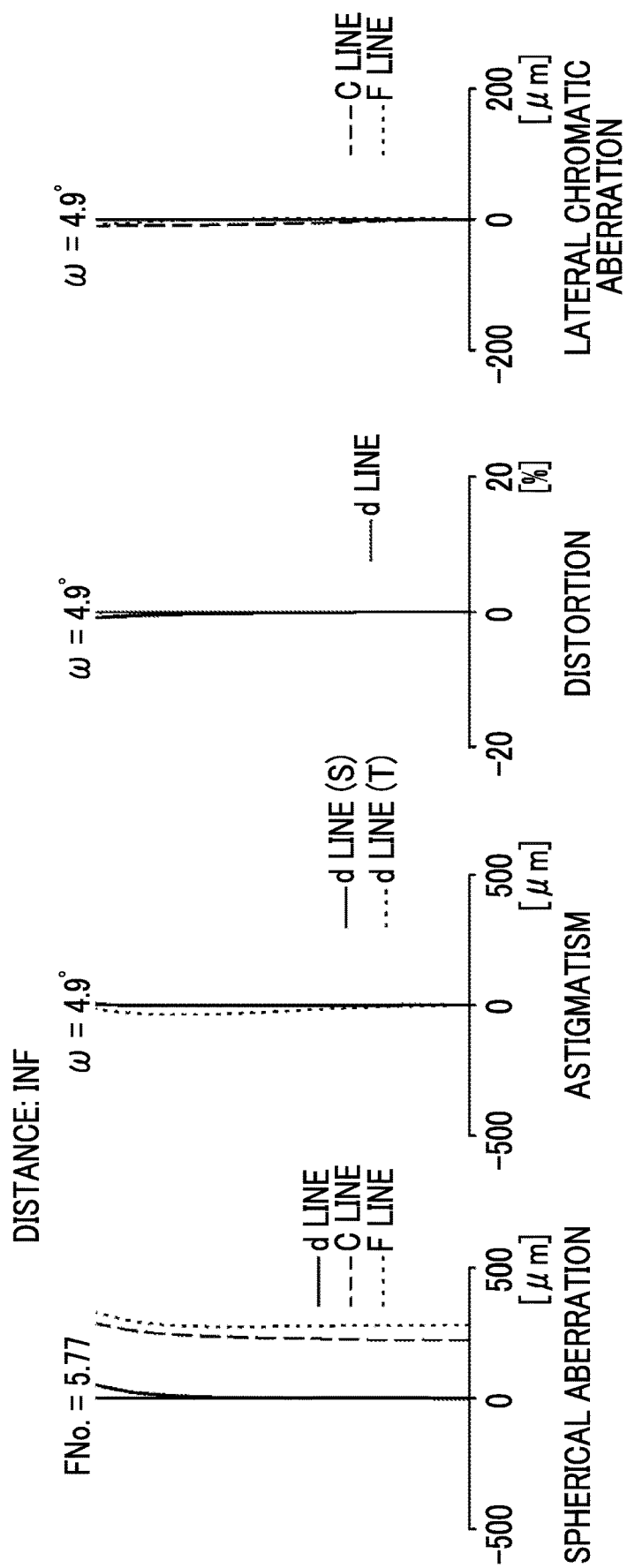
FIG. 9 is a diagram of aberrations in the state where the rear converter lens of Example 3 of the present invention is mounted on the master lens.

Next, the rear converter lens RCL of Example 3 will be described. FIG. 4 shows a cross-sectional view illustrating the entire configuration in a state where the rear converter lens RCL of Example 3 is mounted on the master lens ML. Table 7 shows lens data of the synthetic optical system in which the rear converter lens RCL of Example 3 is mounted on the master lens ML. Table 8 shows data about specification. Further, FIG. 9 shows aberration diagrams in a state where the rear converter lens RCL of Example 3 is mounted on the master lens ML.

Table 7

Example 3•Lens Data (n and ν are Based on d Line)

TABLE 8

| Surface Number | Radius of Curvature | Surface Distance | n | ν |
|---|---|---|---|---|
| 1 | 437.9481 | 4.3400 | 1.48749 | 70.24 |
| 2 | −437.9481 | 0.2300 | | |
| 3 | 88.2356 | 9.2300 | 1.49700 | 81.54 |
| 4 | −318.6800 | 1.9500 | 1.65160 | 58.62 |
| 5 | 184.2906 | 1.0500 | | |
| 6 | 52.2197 | 2.0600 | 1.51742 | 52.43 |
| 7 | 35.0700 | 10.6000 | 1.49700 | 81.54 |
| 8 | 99.3624 | 10.1100 | | |
| 9 | 58.2609 | 4.3800 | 1.90366 | 31.31 |
| 10 | 128.2200 | 1.9500 | 1.80610 | 40.93 |
| 11 | 34.8158 | 16.6200 | | |
| 12 | 41.4281 | 2.3200 | 1.56732 | 42.82 |
| 13 | 29.5030 | 7.1100 | 1.43875 | 94.66 |
| 14 | 439.0296 | 8.5200 | | |
| 15(Stop) | ∞ | 3.7100 | | |
| 16 | 356.6297 | 1.0300 | 1.85150 | 40.78 |
| 17 | 50.9986 | 2.8900 | | |
| 18 | −79.3300 | 0.9000 | 1.72916 | 54.09 |
| 19 | 34.9710 | 3.2800 | 1.84666 | 23.78 |
| 20 | 109.9049 | 6.4100 | | |
| 21 | 130.5900 | 2.6300 | 1.89286 | 20.36 |
| 22 | 45.9840 | 7.6100 | 1.67003 | 47.20 |
| 23 | −108.5346 | 20.1500 | | |
| 24 | 129.0771 | 5.6900 | 1.60342 | 38.03 |
| 25 | −82.4767 | 16.4200 | | |
| 26 | −104.7176 | 1.7500 | 1.72916 | 54.68 |
| 27 | −1000.2365 | 16.4994 | | |
| 28 | −244.0325 | 1.7000 | 1.49700 | 81.54 |
| 29 | 59.0027 | 7.6565 | 1.54814 | 45.78 |
| 30 | −59.0027 | 7.2101 | | |
| 31 | −58.8371 | 1.7000 | 1.88300 | 39.22 |
| 32 | 77.2890 | 9.5200 | 1.62005 | 36.35 |
| 33 | −43.0000 | 1.7000 | 1.83481 | 42.74 |
| 34 | 500.0063 | 0.2000 | | |
| 35 | 69.0352 | 8.5807 | 1.51742 | 52.43 |
| 36 | −85.4299 | 1.7000 | 1.87070 | 40.73 |
| 37 | −187.8275 | 38.5450 | | |
| 38 | ∞ | 3.2000 | 1.51680 | 64.20 |
| 39 | ∞ | 0.0000 | | |

Example 3•Specification (d Line)

| | |
|---|---|
| f | 339.54 |
| Bf | 40.65 |
| FNo. | 5.77 |
| 2ω[°] | 9.8 |

Figure 5:
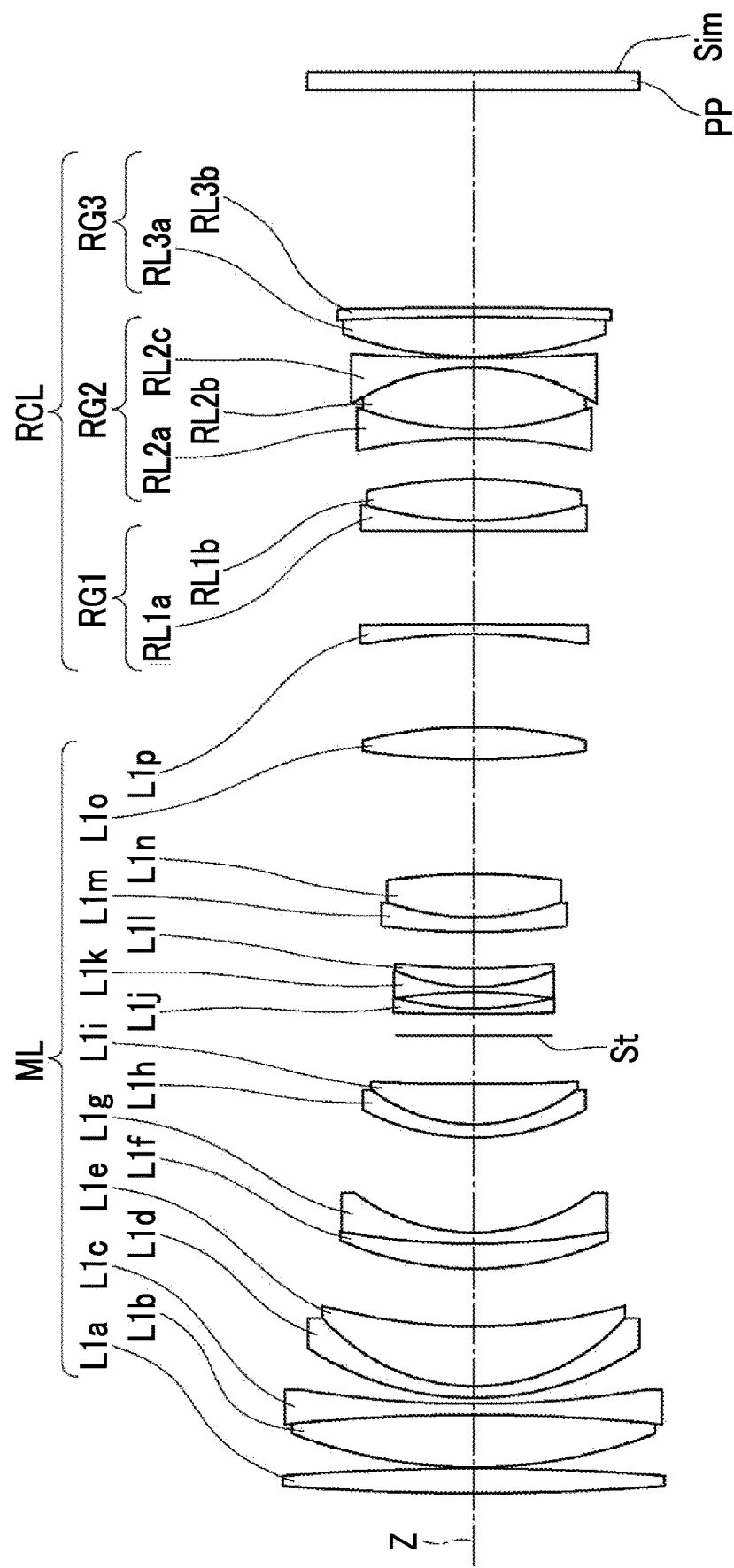
FIG. 5 is a cross-sectional view illustrating a lens configuration in a state where a rear converter lens according to Example 4 of the present invention is mounted on the master lens.
Figure 10:
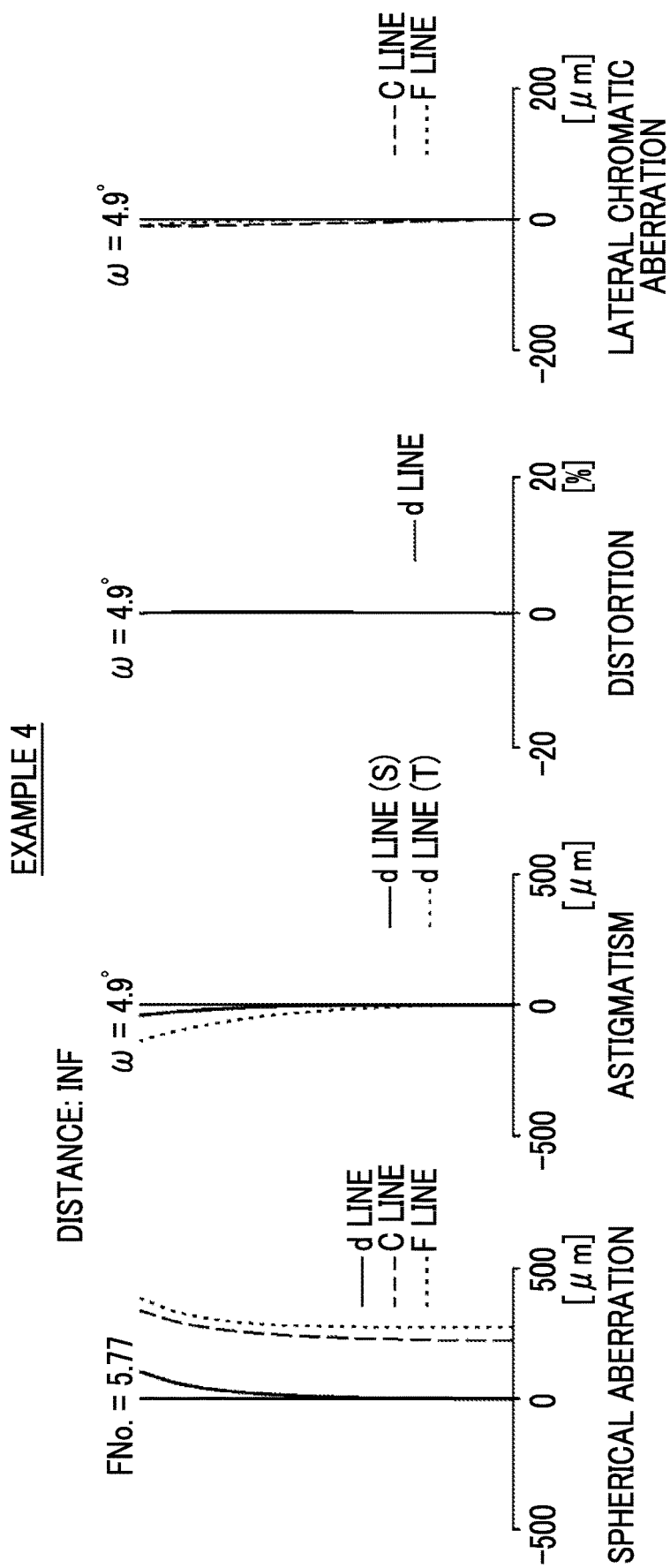
FIG. 10 is a diagram of aberrations in the state where the rear converter lens of Example 4 of the present invention is mounted on the master lens.

Next, the rear converter lens RCL of Example 4 will be described. FIG. 5 shows a cross-sectional view illustrating the entire configuration in a state where the rear converter lens RCL of Example 4 is mounted on the master lens ML. Table 9 shows lens data of the synthetic optical system in which the rear converter lens RCL of Example 4 is mounted on the master lens ML. Table 10 shows data about specification. Further, FIG. 10 shows aberration diagrams in a state where the rear converter lens RCL of Example 4 is mounted on the master lens ML.

Table 9

Example 4•Lens Data (n and ν are Based on d Line)

TABLE 10

| Surface Number | Radius of Curvature | Surface Distance | n | ν |
|---|---|---|---|---|
| 1 | 437.9481 | 4.3400 | 1.48749 | 70.24 |
| 2 | −437.9481 | 0.2300 | | |
| 3 | 88.2356 | 9.2300 | 1.49700 | 81.54 |
| 4 | −318.6800 | 1.9500 | 1.65160 | 58.62 |
| 5 | 184.2906 | 1.0500 | | |
| 6 | 52.2197 | 2.0600 | 1.51742 | 52.43 |
| 7 | 35.0700 | 10.6000 | 1.49700 | 81.54 |
| 8 | 99.3624 | 10.1100 | | |
| 9 | 58.2609 | 4.3800 | 1.90366 | 31.31 |
| 10 | 128.2200 | 1.9500 | 1.80610 | 40.93 |
| 11 | 34.8158 | 16.6200 | | |
| 12 | 41.4281 | 2.3200 | 1.56732 | 42.82 |
| 13 | 29.5030 | 7.1100 | 1.43875 | 94.66 |
| 14 | 439.0296 | 8.5200 | | |
| 15(Stop) | ∞ | 3.7100 | | |
| 16 | 356.6297 | 1.0300 | 1.85150 | 40.78 |
| 17 | 50.9986 | 2.8900 | | |
| 18 | −79.3300 | 0.9000 | 1.72916 | 54.09 |
| 19 | 34.9710 | 3.2800 | 1.84666 | 23.78 |
| 20 | 109.9049 | 6.4100 | | |
| 21 | 130.5900 | 2.6300 | 1.89286 | 20.36 |
| 22 | 45.9840 | 7.6100 | 1.67003 | 47.20 |
| 23 | −108.5346 | 20.1500 | | |
| 24 | 129.0771 | 5.6900 | 1.60342 | 38.03 |
| 25 | −82.4767 | 16.4200 | | |
| 26 | −104.7176 | 1.7500 | 1.72916 | 54.68 |
| 27 | −1000.2365 | 16.4673 | | |
| 28 | 32790.3739 | 1.7000 | 1.59282 | 68.62 |
| 29 | 66.5820 | 7.3100 | 1.58144 | 40.75 |
| 30 | −84.7954 | 7.2101 | | |
| 31 | −96.5684 | 1.7000 | 1.88300 | 39.22 |
| 32 | 57.5699 | 10.6486 | 1.59270 | 35.31 |
| 33 | −40.0355 | 1.7000 | 1.87070 | 40.73 |
| 34 | 336.5662 | 0.2000 | | |
| 35 | 68.9256 | 7.0100 | 1.51823 | 58.90 |
| 36 | −506.8420 | 1.7000 | 2.00100 | 29.13 |
| 37 | −754.5895 | 38.2207 | | |
| 38 | ∞ | 3.2000 | 1.51680 | 64.20 |
| 39 | ∞ | 0.0000 | | |

Example 4•Specification (d Line)

| | |
|---|---|
| f | 339.55 |
| Bf | 40.33 |
| FNo. | 5.77 |
| 2ω[°] | 9.8 |

Table 11 shows values corresponding to Conditional Expressions (1) to (4) of the rear converter lenses RCL of Examples 1 to 4. It should be noted that, in the above-mentioned examples, the d line is set as the reference wavelength, and the values shown in Table 11 are values at the reference wavelength.

TABLE 11

| Expression Number | Conditional Expression | Example 1 | Example 2 | Example 3 | Example 4 |
|---|---|---|---|---|---|
| (1) | f1/fC | −1.303 | −0.818 | −0.942 | −1.234 |
| (2) | f2/fC | 0.342 | 0.296 | 0.298 | 0.335 |
| (3) | f3/fC | −1.019 | −1.124 | −0.974 | −1.057 |
| (4) | ν1 − ν2 | 14.7 | 27.4 | 35.7 | 28.0 |

Figure 11:
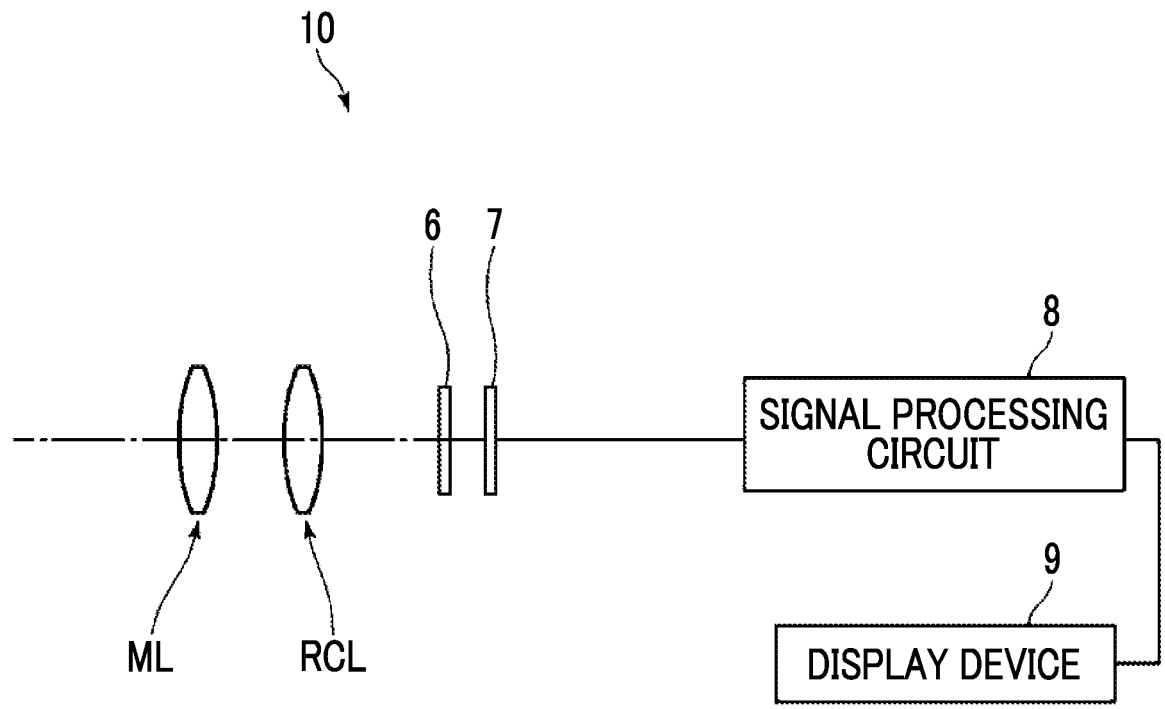
FIG. 11 is a schematic configuration diagram of an imaging apparatus comprising the rear converter lens according to the above-mentioned embodiment of the present invention.

As can be seen from the above-mentioned data, all the rear converter lenses RCL of Examples 1 to 4 each have favorable optical performance Next, an imaging apparatus 10 according to an embodiment of the present invention will be described. FIG. 11 shows a schematic configuration diagram of the imaging apparatus 10 using the rear converter lens RCL according to the above-mentioned embodiment of the present invention. The related imaging apparatus 10 is a non-reflex digital camera in which the rear converter lens RCL is detachably mounted on the image side of the master lens ML. It should be noted that, in FIG. 11, each lens group is schematically illustrated.

The imaging apparatus 10 shown in FIG. 11 comprises an imaging lens that is a synthetic optical system consisting of the rear converter lens RCL and the master lens ML, a filter 6 that has a function such as a lowpass filter disposed on the image side of the imaging lens, an imaging element 7 that is disposed on the image side of the filter 6, and a signal processing circuit 8. Further, the imaging apparatus 10 comprises a focus control section (not shown in the drawing) for performing focusing of the master lens ML.

The rear converter lens RCL is detachably formed on the master lens ML. The imaging element 7 converts an optical image, which is formed through the imaging lens, into an electrical signal. For example, as the imaging element 7, it is possible to use a charge coupled device (CCD), complementary metal oxide semiconductor (CMOS), and the like. The imaging element 7 is disposed such that the imaging surface thereof is coplanar with the image plane of the imaging lens. An image, which is captured through the imaging lens, is formed on the imaging surface of the imaging element 7, an output signal of the image from the imaging element 7 is calculated by the signal processing circuit 8, and the image is displayed on the display device 9. In addition, the focus control section, which is not shown in the drawing, performs the focusing operation.

In the imaging apparatus 10 according to the embodiment of the present invention, a captured image signal corresponding to an optical image, which is formed through the synthetic optical system in which the high-performance rear converter lens RCL and the master lens ML according to the embodiment of the present invention are combined, is output. Therefore, it is possible to obtain a photographed image with a high resolution.

The present invention has been hitherto described through embodiments and examples, but the present invention is not limited to the above-mentioned embodiments and examples, and may be modified into various forms. For example, values such as the radius of curvature, the surface distance, the refractive index, and the Abbe number of each lens component are not limited to the values shown in the numerical examples, and different values may be used therefor.

In the above-mentioned embodiment of the imaging apparatus 10, the rear converter lens mounted on the non-reflex digital camera has been described as an example, and the imaging apparatus of the present invention is not limited to this. For example, the rear converter lens of the present invention may be applied to imaging apparatuses such as a video camera, a single-lens reflex camera, a film camera, a movie camera, and a broadcast camera.

EXPLANATION OF REFERENCES

6: filter
7: imaging element
8: signal processing circuit
9: display device
10: imaging apparatus
L1a to L1p: lens
ML: master lens
PP: optical member
RCL: rear converter lens
RG1: first lens group (first lens group included in rear converter lens)
RG2: second lens group (second lens group included in rear converter lens)
RG3: third lens group (third lens group included in rear converter lens)
RL1a to RL3b: lens
Sim: image plane
St: aperture stop
Z: optical axis

What is claimed is:

1. An optical system that has a negative refractive power and is mounted on an image side of a master lens so as to make a focal length of a whole system including the master lens larger than a focal length of the master lens alone, the optical system consisting of, in order from an object side:

a first lens group that has a positive refractive power;

a second lens group that has a negative refractive power; and a third lens group that has a positive refractive power, wherein the first lens group consists of a negative lens concave toward the image side and a positive lens convex toward the object side in order from the object side, wherein the second lens group consists of a cemented lens in which a negative lens concave toward the image side, a positive lens convex toward both sides, and a negative lens concave toward the object side are cemented in order from the object side, wherein the third lens group includes, closest to the object side, a cemented lens in which a positive lens convex toward the object side and a negative lens are cemented in order from the object side, a lens surface closest to an image side of the third lens group has a convex shape toward the image side.

2. The optical system according to claim 1,
wherein the negative lens of the first lens group has a meniscus shape concave toward the image side.

3. The optical system according to claim 1,
wherein the positive lens of the first lens group has a shape convex toward both sides.

4. The optical system according to claim 1,
wherein the negative lens closest to the object side of the second lens group has a shape concave toward both sides.

5. The optical system according to claim 1,
wherein the positive lens of the third lens group has a shape convex toward both sides.

6. The optical system according to claim 1,
wherein the negative lens of the third lens group has a shape concave toward both sides.

7. An imaging apparatus comprising the optical system according to claim 1.

8. The optical system according to claim 1,
wherein assuming that
a focal length of the first lens group is f1, and
a focal length of the optical system is fC,
Conditional Expression (1) is satisfied, $$-1.4 < f1/fC < -0.5 \quad (1).$$

9. The optical system according to claim 8,
wherein Conditional Expression (1-1) is satisfied, $$-1.35 < f1/fC < -0.7 \quad (1\text{-}1).$$

10. The optical system according to claim 1,
wherein assuming that
a focal length of the second lens group is f2, and
a focal length of the optical system is fC,
Conditional Expression (2) is satisfied, $$0.2 < f2/fC < 0.36 \quad (2).$$

11. The optical system according to claim 10,
wherein Conditional Expression (2-1) is satisfied, $$0.25 < f2/fC < 0.35 \quad (2\text{-}1).$$

12. The optical system according to claim 1,
wherein assuming that
a focal length of the third lens group is f3, and
a focal length of the optical system is fC,
Conditional Expression (3) is satisfied, $$-1.5 < f3/fC < -0.8 \quad (3).$$

13. The optical system according to claim 12,
wherein Conditional Expression (3-1) is satisfied, $$-1.3 < f3/fC < -0.9 \quad (3\text{-}1).$$

14. The optical system according to claim 1,
wherein assuming that
an Abbe number of the negative lens of the first lens group is ν1, and
an Abbe number of the positive lens of the first lens group is ν2,
Conditional Expression (4) is satisfied, $$12 < \nu1 - \nu2 < 45 \quad (4).$$

15. The optical system according to claim 14,
wherein Conditional Expression (4-1) is satisfied, $$14 < \nu1 - \nu2 < 40 \quad (4\text{-}1).$$

\* \* \* \* \*